United States Patent Office 2,855,395
Patented Oct. 7, 1958

2,855,395

PHTHALIDES

Donald D. Wheeler and David C. Young, Midland, Mich., assignors to The Dow Chemical Company, Midland, Mich., a corporation of Delaware No Drawing. Application July 11, 1956
Serial No. 597,066

6 Claims. (Cl. 260—239.6)

This invention is concerned with phthalides having the formula

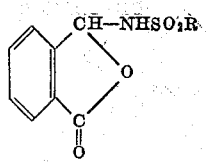

In this and succeeding formulae, R represents an aryl radical. The expression "aryl" as herein employed refers to phenyl and substituted phenyl radicals such as alkyl-phenyl, nitrophenyl, alkoxy-phenyl, phenylphenyl, and halophenyl. These compounds are crystalline solids or viscous oils soluble in many organic solvents such as benzene, toluene and acetone and substantially insoluble in water. These compounds have utility as parasiticides to be employed in compositions for the control of insects, nematodes and bacteria. Certain of the compounds also are useful as herbicides for the control of undesirable vegetation.

The above compounds may be prepared by causing phthalaldehydic acid to react with a sulfonamide having the structure $$RSO_2NH_2$$

to produce the desired phthalide and water of reaction. The terms "phthalaldehydic acid" and "3-hydroxyphthalide" refer to a compound having the structure

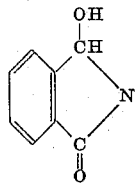

Phthalaldehydic acid is often represented in the literature as having the structure

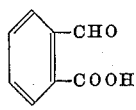

However, the acid employed in this invention and prepared as hereinafter described exists almost entirely in the 3-hydroxyphthalide ring structure, as indicated by a study of its infrared absorption spectrum. Infrared data also indicate the phthalide products to have the ring structure.

In the synthesis, good results are obtained when substantially equimolar proportions of the reactants are employed. The reaction takes place smoothly in the temperature range of from 20° to 170° C. but a range of from 90° to 130° C. is considered preferable. Solvents such as benzene and toluene may be employed as reaction medium if desired.

In carrying out the reaction, phthalaldehydic acid and the appropriate sulfonamide are mixed and heated under reflux for from 1 to 5 hours. As the heating proceeds, the product and water of reaction are formed. The latter may be removed during the heating process, if desired, by reducing the pressure on the system and allowing the water to distill out of the reaction zone. At the end of the heating period, the mixture is poured into water to precipitate the product. The latter is recovered therefrom by filtration. The product may be purified, if desired, by washing or by recrystallization.

The following examples illustrate the invention, but are not to be construed as limiting.

Example 1.—3-benzenesulfonamidophthalide

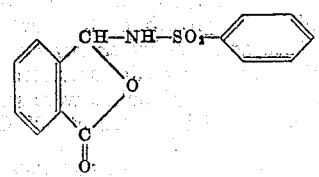

67 grams (0.427 mole) of benzenesulfonamide and 64 grams (0.427 mole) of phthalaldehydic acid were mixed and heated to about 130° C. A reaction took place with the formation of water of reaction which refluxed in the mixture. The mixture was maintained under reflux for 3 hours, thereafter cooled to 110° C., and then poured into water whereupon a solid precipitated. The latter was separated by filtration and washed with water and then with alcohol to obtain a 3-benzenesulfonamidophthalide product melting at 178°–180° C. The latter was obtained in a yield of 76 grams or 62 percent of theoretical.

Example 2.—3-(p-toluenesulfonamido)phthalide

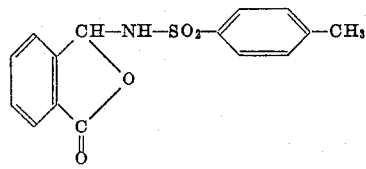

85.6 grams (0.5 mole) of p-toluenesulfonamide and 75.0 grams (0.5 mole) of phthalaldehydic acid were mixed and heated until water of reaction formed and refluxed in the reaction mixture. The mixture was maintained at about 125° C. and under reflux for 4 hours. The mixture then was poured into 700 milliliters of water whereupon a solid precipitated. The solid was recovered by filtration, washed, and recrystallized from aqueous ethanol to obtain a 3-(p-toluenesulfonamido) phthalide product melting at 151°–154° C.

Example 3.—3-(4-bromobenzenesulfonamido)phthalide 35.4 grams (0.15 mole) of p-bromobenzenesulfonamide and 22.5 grams (0.15 mole) of phthalaldehydic acid were mixed and heated at 120°–130° C. for 1 hour. A solid formed and precipitated in the mixture during the heating. After completion of the heating, the mixture was cooled, and the solid slurried with alcohol, collected by filtration, washed with alcohol and dried to obtain a 3-(4-bromobenzenesulfonamido)phthalide product melting at 211°–212° C. The latter was obtained in a yield of 52 grams or 94 percent of theoretical.

Example 4.—3-(4-nitrobenzenesulfonamido)phthalide 26.2 grams (0.13 mole) of 4-nitrobenzenesulfonamide and 19.5 grams (0.13 mole) of phthalaldehydic acid were mixed and heated to about 120°–130° C. until the water of reaction began to reflux and then heated under reflux for 3 hours. The mixture was then cooled and poured into 600 milliliters of water whereupon a gummy solid precipitated. The latter was washed repeatedly with alcohol and dried to obtain at 3-(4-nitrobenzene-sulfonamido)phthalide product melting at 133°–135° C.

In similar preparations, the following phthalides are prepared:

3-(2-ethoxybenzenesulfonamido)phthalide having a molecular weight of 333 by the reaction phthalaldehydic acid with 2-ethoxybenzenesulfonamide.

3-(3-chlorobenzenesulfonamido)phthalide having a molecular weight of 323.5 by the reaction of phthalaldehydic acid with 3-chlorobenzenesulfonamide.

3-(2,3-dimethylbenzenesulfonamido)phthalide having a molecular weight of 317 by the reaction of phthalaldehydic acid with 2,3-dimethylbenzenesulfonamide.

3-(2,4-dimethoxybenzenesulfonamido)phthalide having a molecular weight of 349 by the reaction of phthalaldehydic acid with 2,4-dimethoxybenzenesulfonamide.

The products of the present invention are valuable in parasiticidal compositions. In a representative operation, complete inhibition of growth of the bacterial species *Salmonella typhosa* and *Staphylococcus aureus* was obtained when nutrient agar media saturated with 3-(4-bromobenzenesulfonamido)phthalide were streaked with the above organisms and incubated at 30° C. for three days.

The products are also useful in insecticidal compositions. For example, 100 percent mortality was observed when houseflies (*Musca domestica*) and American cockroaches (*Periplaneta americana*) were wetted with aqueous compositions containing 0.24 gram of 3-(4-nitrobenzenesulfonamido)phthalide per 100 milliliters of ultimate dispersion.

The phthalaldehydic acid employed in this invention may be prepared by first photochlorinating o-xylene to obtain α,α,α,α′,α′-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

We claim:

1. A phthalide having the formula

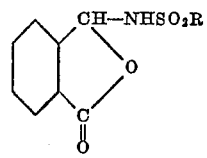

wherein R represents a member of the group consisting of phenyl, alkylphenyl, nitrophenyl, alkoxyphenyl, phenylphenyl and halophenyl.

2. 3-benzenesulfonamidophthalide.
3. 3-(4-methylbenzenesulfonamido)phthalide.
4. 3-(4-bromobenzenesulfonamido)phthalide.
5. 3-(4-nitrobenzenesulfonamido)phthalide.
6. A method for preparing a phthalide having the formula

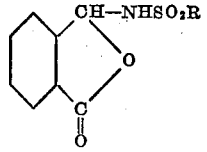

wherein R represents a member of the group consisting of phenyl, alkylphenyl, nitrophenyl, alkoxyphenyl, phenylphenyl and halophenyl, which comprises the step of mixing together phthalaldehydic acid and a sulfonamide having the formula $$RSO_2NH_2$$

wherein R is as above defined and maintaining the mixture at a temperature of from 20° to 170° C. for a time sufficient to allow completion of the reaction.

No references cited.